(12) United States Patent
Burd et al.

(10) Patent No.: US 7,751,138 B1
(45) Date of Patent: *Jul. 6, 2010

(54) CORRECTING ERRORS IN DISK DRIVE READ BACK SIGNALS BY ITERATING WITH THE REED-SOLOMON DECODER

(75) Inventors: Gregory Burd, Santa Clara, CA (US); Zining Wu, Los Altos, CA (US); Mats Oberg, Cupertino, CA (US); Pantas Sutardja, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 454 days.

This patent is subject to a terminal disclaimer.

(21) Appl. No.: 10/313,651

(22) Filed: Dec. 6, 2002

Related U.S. Application Data

(63) Continuation-in-part of application No. 10/135,422, filed on Apr. 29, 2002, now Pat. No. 6,961,197.

(60) Provisional application No. 60/352,756, filed on Jan. 28, 2002, provisional application No. 60/344,407, filed on Dec. 28, 2001.

(51) Int. Cl.
*G11B 5/09* (2006.01)
*G11B 20/14* (2006.01)
*G11B 20/16* (2006.01)

(52) U.S. Cl. .......................... 360/53; 360/40
(58) Field of Classification Search ................ 360/48, 360/53

See application file for complete search history.

(56) References Cited

U.S. PATENT DOCUMENTS

| | | | |
|---|---|---|---|
| 4,821,268 A * | 4/1989 | Berlekamp ................ 714/784 |
| 5,241,546 A | 8/1993 | Peterson et al. |
| 5,341,387 A | 8/1994 | Nguyen |
| 5,434,719 A | 7/1995 | Miller et al. |
| 5,446,743 A | 8/1995 | Zook |
| 5,539,774 A * | 7/1996 | Nobakht et al. ............. 375/232 |
| 5,677,802 A * | 10/1997 | Saiki et al. ..................... 360/51 |
| 5,689,532 A * | 11/1997 | Fitzpatrick .................. 375/341 |
| 5,844,920 A * | 12/1998 | Zook et al. ................... 714/769 |
| 5,974,583 A | 10/1999 | Joo |
| 6,009,549 A | 12/1999 | Bliss et al. |
| 6,154,868 A | 11/2000 | Cox et al. |
| 6,192,492 B1 | 2/2001 | Masiewicz et al. |
| 6,233,709 B1 * | 5/2001 | Zhang et al. ................. 714/774 |
| 6,249,824 B1 | 6/2001 | Henrichs |
| 6,343,367 B1 | 1/2002 | Shen et al. |
| 6,513,141 B1 | 1/2003 | Livingston |
| 6,657,803 B1 | 12/2003 | Ling et al. |
| 6,668,349 B1 * | 12/2003 | Sawaguchi ................... 714/755 |
| 6,694,477 B1 | 2/2004 | Lee |
| 6,732,328 B1 * | 5/2004 | McEwen et al. ............. 714/795 |
| 6,747,829 B2 * | 6/2004 | Stanek et al. ................. 360/53 |
| 6,754,018 B2 | 6/2004 | Takahashi |
| 6,757,117 B1 * | 6/2004 | Livingston .................... 360/25 |
| 6,871,315 B2 | 3/2005 | Seki |
| 6,961,197 B1 | 11/2005 | Burd et al. |

(Continued)

*Primary Examiner*—Joseph H Feild
*Assistant Examiner*—Daniell L Negrón

(57) ABSTRACT

A signal detector is provided to detect symbols in a read back signal. The signal detector includes a first detector to generate raw decisions as a function of the read back signal and to generate at least one next best decision. A list-aided decoder generates the final decision based on both the raw decisions and the at least one next best decision from the first decoder.

64 Claims, 8 Drawing Sheets

U.S. PATENT DOCUMENTS

| | | |
|---|---|---|
| 7,032,127 B1 | 4/2006 | Egan et al. |
| 7,050,517 B1 | 5/2006 | Sallaway et al. |
| 7,149,955 B1 | 12/2006 | Sutardja et al. |
| 7,274,524 B1 | 9/2007 | Burd et al. |
| 7,372,652 B1 * | 5/2008 | Burd et al. .................... 360/53 |

* cited by examiner

CORRECTING ERRORS IN DISK DRIVE READ BACK SIGNALS BY ITERATING WITH THE REED-SOLOMON DECODER

CROSS-REFERENCE TO RELATED APPLICATIONS

This application is a continuation-in-part application of application Ser. No. 10/135,422 filed Apr. 29, 2002, which claims the benefit of the filing date of U.S. provisional applications No. 60/344,407 filed Dec. 28, 2001, and No. 60/352,756 filed Jan. 28, 2002, the content of each of which is herein incorporated by reference in its entirety.

TECHNICAL FIELD

This invention relates to a detection scheme for input signals of communication system channels.

BACKGROUND

Data stored on magnetic media, such as hard disk drives, is typically encoded using error correction code so that errors that occur in storage and read back of the data might be detected and corrected. In conventional systems, the read back signal is typically detected by a Viterbi detector that makes bit-by-bit (hard) decisions of the read back signal. The decisions from the Viterbi usually include errors. A post-processor may be used in an attempt to correct the errors before sending them to the error correction code decoder. However, during post-processing of the Viterbi decisions, the post-processor sometimes makes mis-corrections leading to potentially more errors in the post-processed signal than in the Viterbi detected signal. A decoder applies an error correction routine to the processed signal to retrieve codewords in the signal. If the processed signal contains too many errors, the decoder will decode the sequence to an incorrect codeword, which may result in a retry being initiated. During a retry, the entire process repeats beginning with the Viterbi detector in an attempt to reduce the number of errors generated in the bit decisions so that after post-processing the errors are low enough for the decoder to generate accurate codewords. Each retry is computationally complex and may consume a significant amount of computation time. In addition, during each retry a different set of errors may occur in the Viterbi decisions and post-processed signal resulting in further retries.

SUMMARY

A signal detector is provided to detect symbols in a read back signal. The signal detector includes a first detector to generate raw decisions as a function of the read back signal and to generate at least one next best decision. A list-aided decoder generates the final decision based on both the raw decisions and the at least one next best decision from the first decoder.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
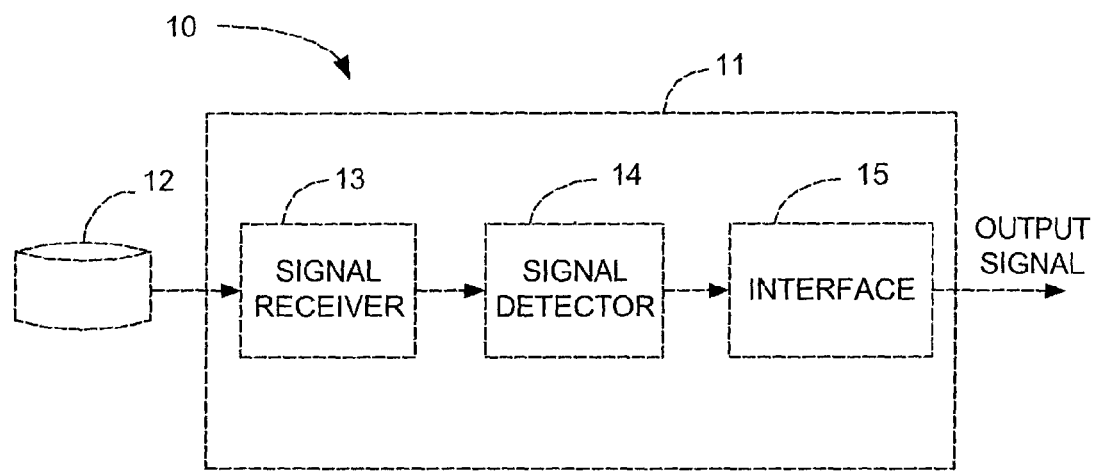
FIG. 1A is a block diagram of one aspect of an error correction system for read signals from a disk drive.

FIG. 1A shows a disk drive system 10 including a read channel device 11 for detecting a read back signal from a hard disk drive 12. Although, the invention may preferably be employed as part of a disk drive system, any communication system is suitable and in particular communication systems having a noisy communication channel. The read channel device 11 may include a signal receiver 13 to receive and condition the read back signal. A signal detector 14 detects and decodes the conditioned read back signal to generate a codeword. The signal detector 14 may attempt to decode a detected symbol multiple times to obtain a correct codeword. An interface circuit 15 coupled to the signal detector 21 outputs the codeword.

Figure 1B:
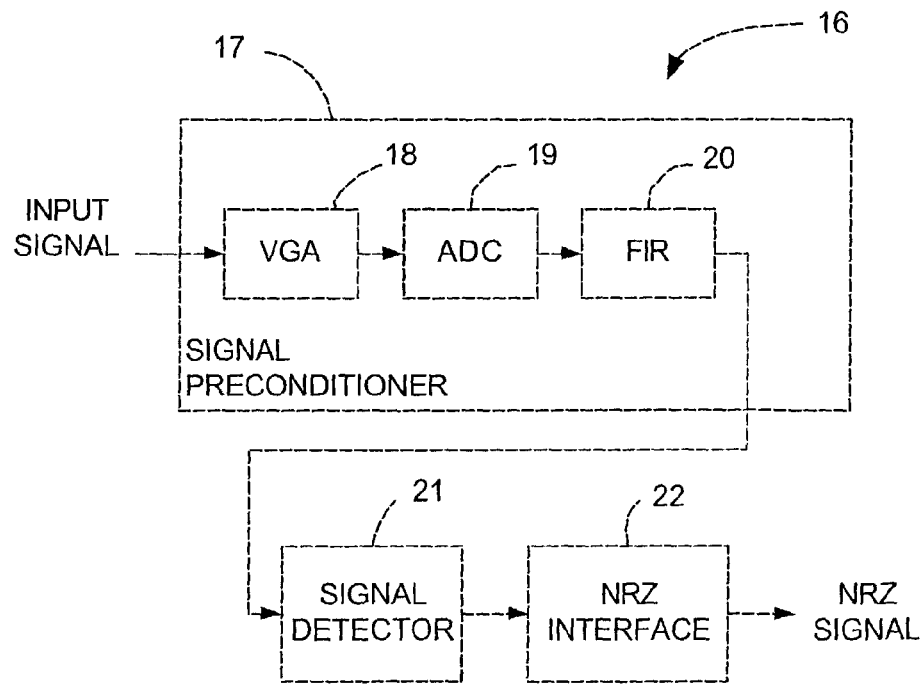
FIG. 1B is a block diagram of one aspect of an error correction system for noisy input signals.

FIG. 1B shows a read channel device 16 for detecting an input signal. The read channel device 16 may include a signal preconditioner 17 to receive the input signal. A signal detector 21 detects and decodes the conditioned input signal to generate a codeword. The signal detector 21 may attempt to decode a detected symbol multiple times to obtain a correct codeword. An interface circuit 22 coupled to the signal detector 21 outputs the codeword. Any form of preconditioner 17 may be employed. One example includes a variable gain amplifier (VGA) 18 coupled to an analog-to-digital converter (ADC) 19 and finite-impulse-response filter (FIR) 20.

Figure 7:
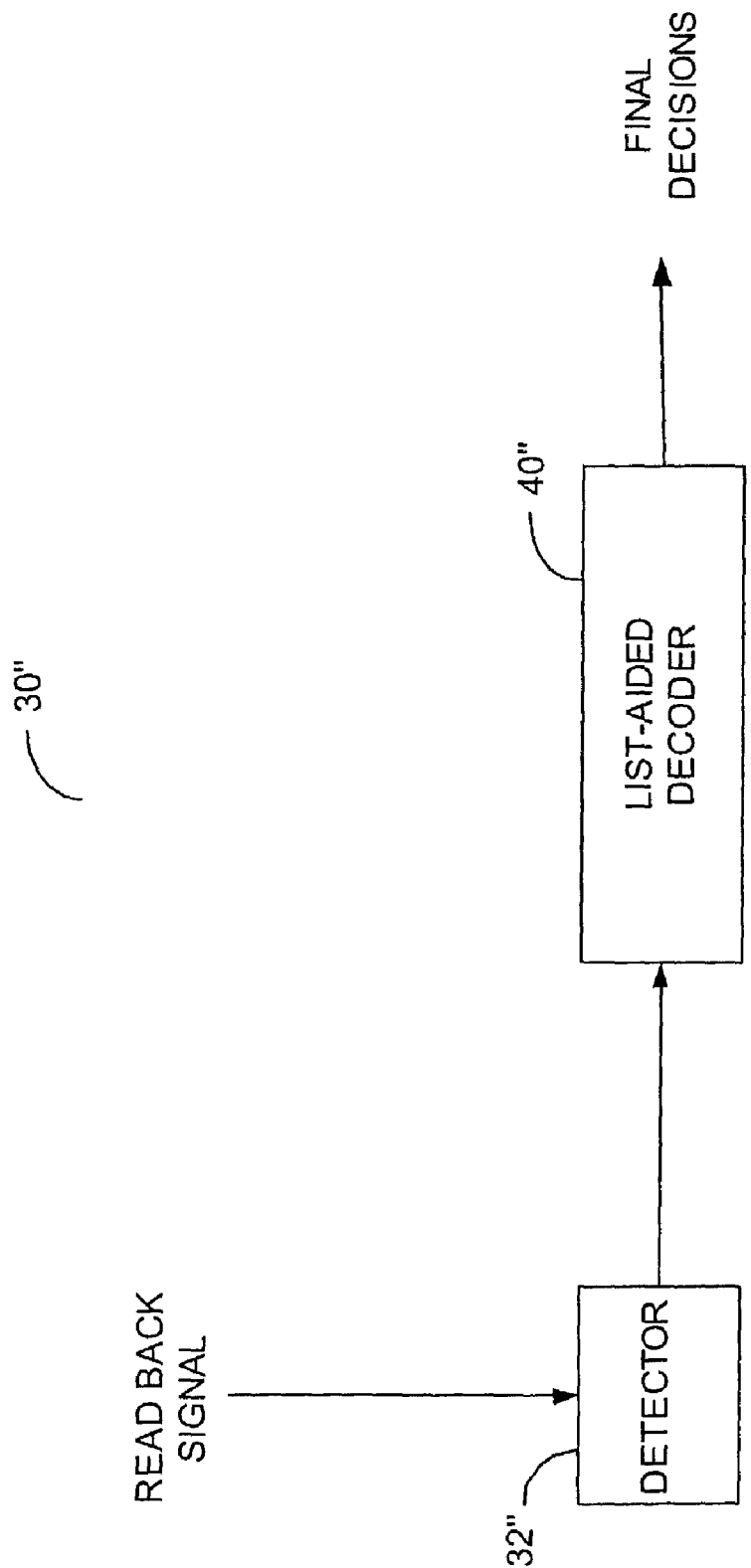
FIG. 7 is a block diagram of a further aspect of an error correction system for read back signals.
Figure 8:
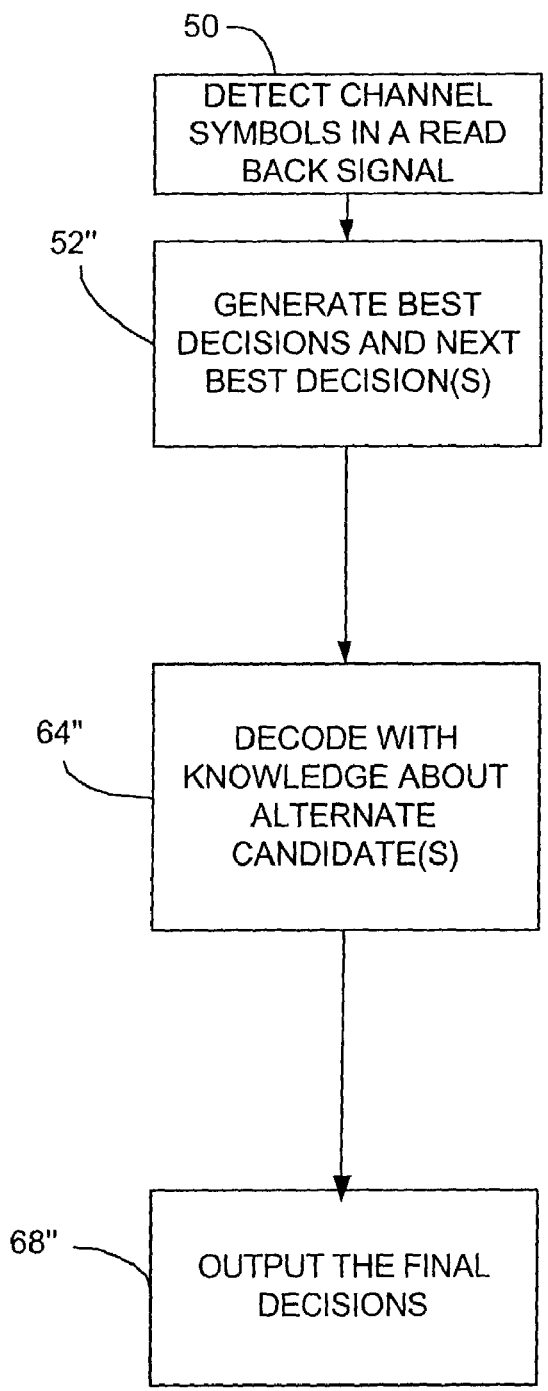
FIG. 8 is a flow diagram of the further aspect of an error correction system for read back signals in accordance with FIG. 7.

FIG. 7 shows a signal detector 30" in accordance with the principles of the invention, and FIG. 8 is a flow chart of the steps performed by signal detector 30". The signal detector 30" detects and decodes a read back signal from a hard disk drive (not shown) or other suitable source. The signal detector 30" includes a detector 32" for detecting the channel symbols of the read back signal (step 50). The detector 32" may be any Viterbi-like detector including selectable noise-predictive detectors, and generates at least one next best decision (candidate list). The list-aided decoder 40", which is responsive to candidate list from detector 32", takes advantage of the list of possible alternative candidates when it performs decoding and determines whether the sequence in the read back signal has been decoded to the correct codeword (step 64").

Figure 5:
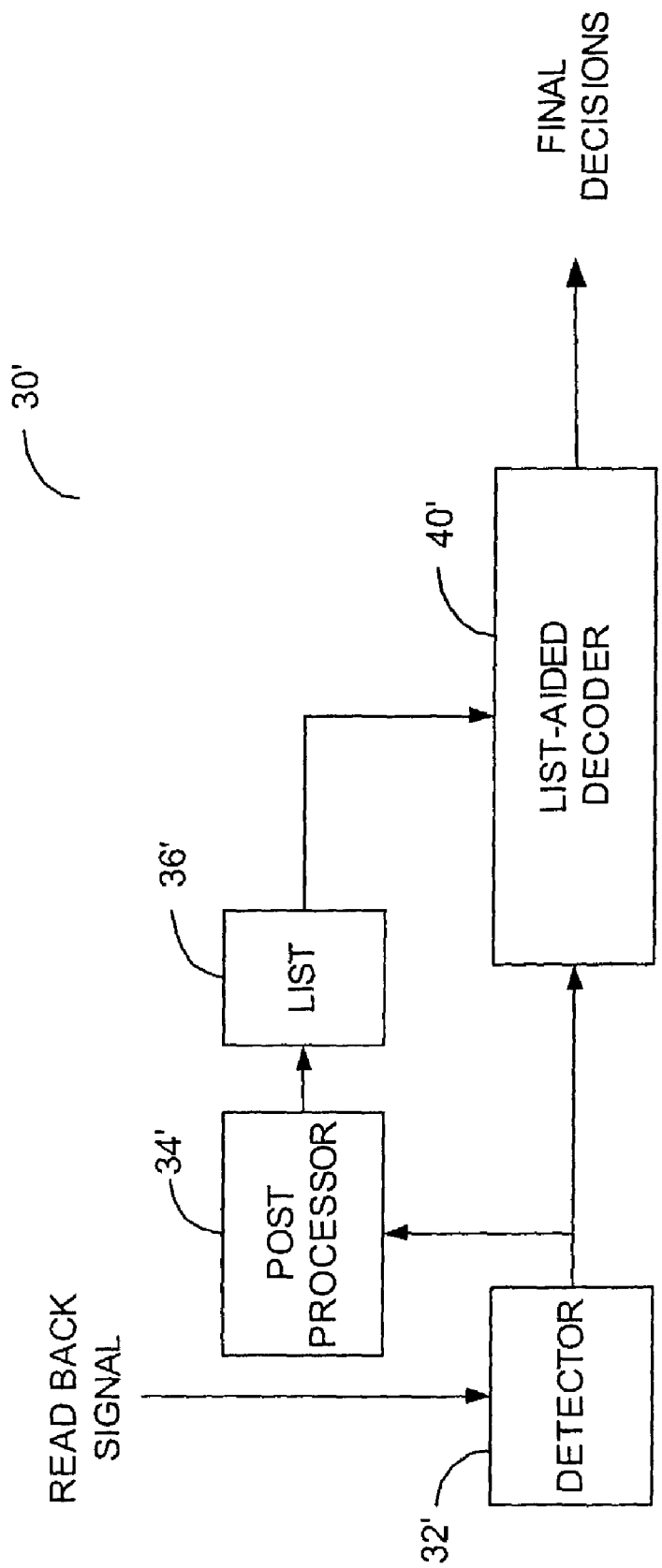
FIG. 5 is a block diagram of an additional aspect of an error correction system for read back signals.
Figure 6:
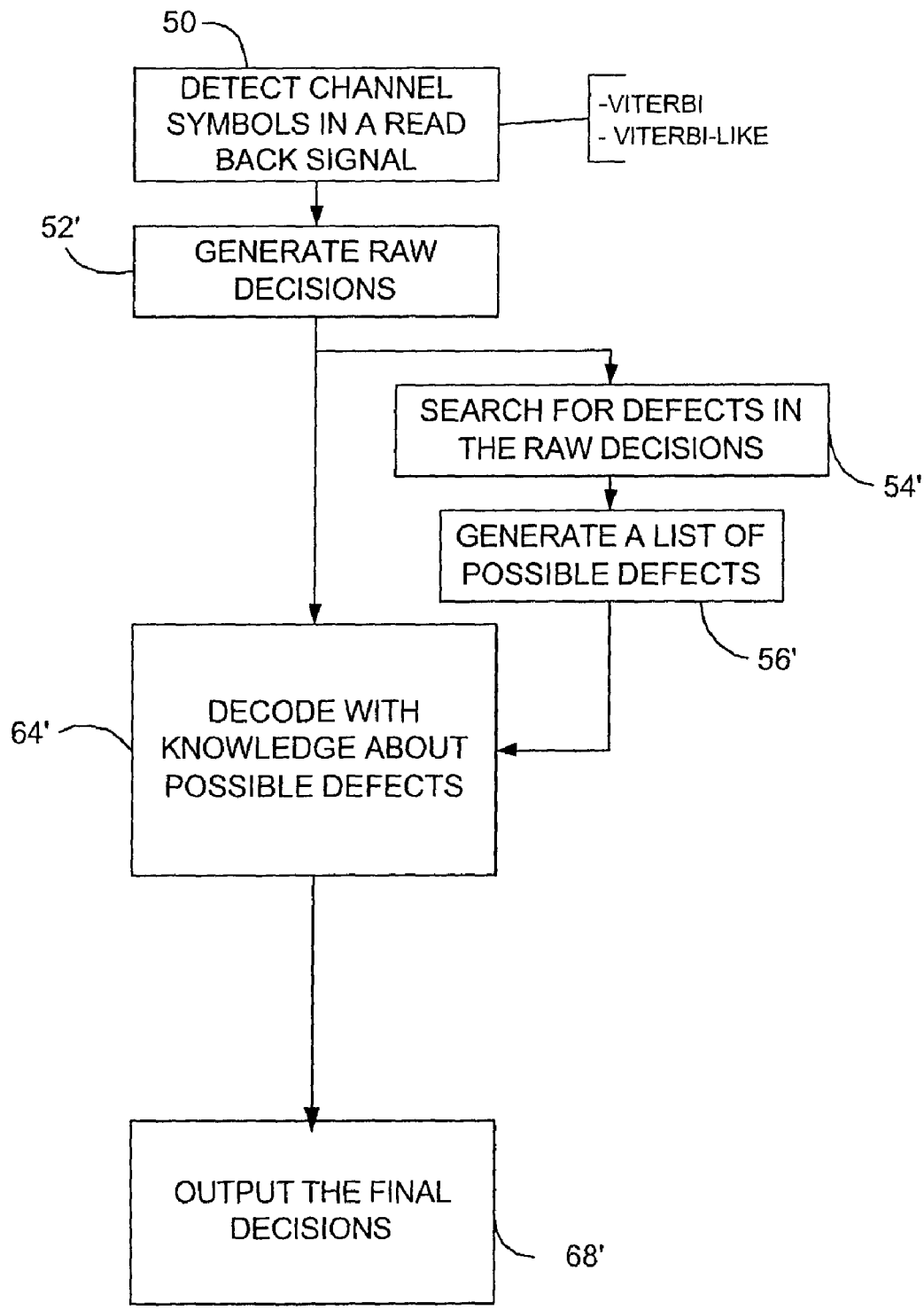
FIG. 6 is a flow diagram of the additional aspect of an error correction system for read back signals in accordance with FIG. 5.

FIG. 5 shows another signal detector 30' in accordance with the principles of the invention, and FIG. 6 is a flow chart of the steps performed by signal detector 30'. The signal detector 30' detects and decodes a read back signal from a hard disk drive (not shown). The signal detector 30' includes a detector 32' for detecting the channel symbols of the read back signal (step 50), and generates raw decisions (step 52'). The detector 32' may be any Viterbi-like detector including selectable noise-predictive detectors. A post processor 34' searches for defects in the raw decisions (step 54') A list circuit 36' generates at least one next best decision (step 56'). The list-aided decoder 40' which is responsive to the list circuit 36' and detector 32' takes advantage of the list of possible defects when it performs decoding and determines whether the sequence in the read back signal has been decoded to the correct codeword (step 64').

Figure 2:
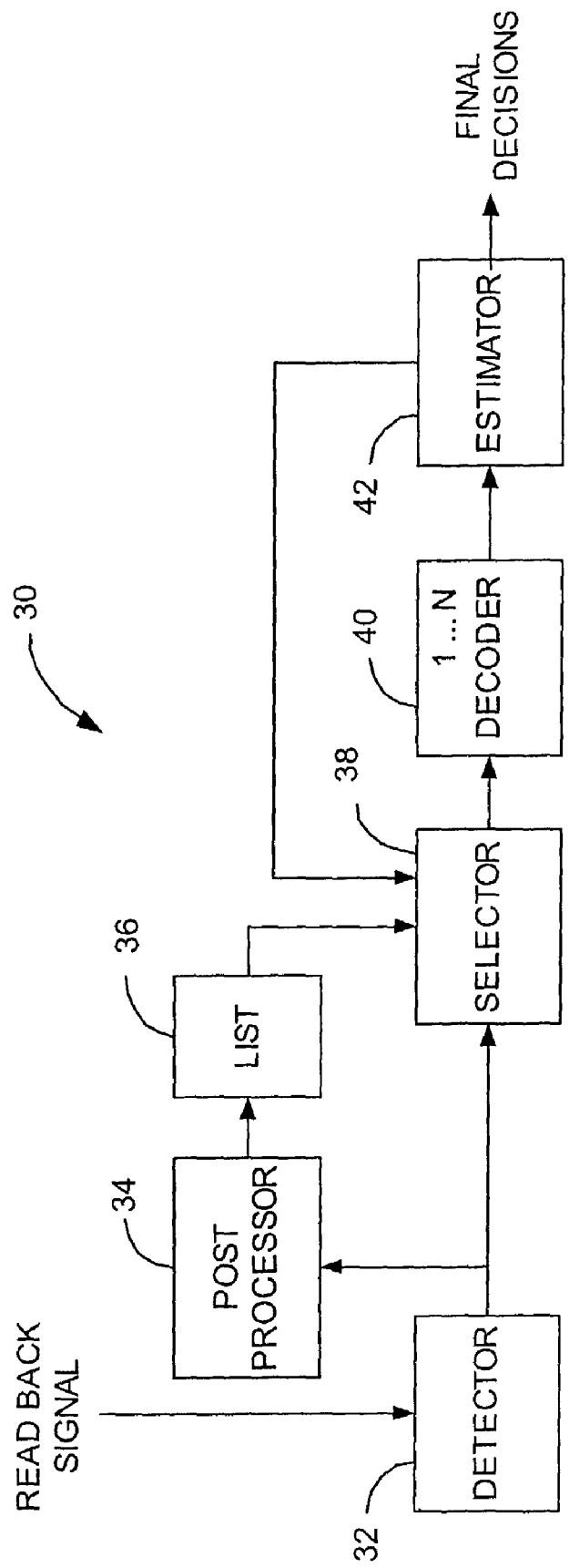
FIG. 2 is a block diagram of another aspect of an error correction system for read back signals.

FIG. 2 shows a further signal detector 30 in accordance with the principles of the invention. The signal detector 30 detects and decodes a read back signal from a hard disk drive (not shown). The signal detector 30 includes a detector 32 to generate raw decisions based on the read back signal. The detector 32 may be any Viterbi-like detector including selectable noise-predictive detectors. A post-processor 34 evaluates the raw decisions to determine whether any possible errors are included within the decisions. The post-processor 34 generates a list 36 of the possible defects. The possible defects may be grouped in any manner in the list 36 such as being categorized as either possible errors or possible erasures, or being listed by likelihood of being an error or erasure. A selector 38 selects one or more of the possible defects from the list 36 and applies a correction technique or marks an erasure to generate modified decisions. A decoder 40 decodes the modified decisions to generate final decisions. The decoder 40 is preferably a single Reed-Solomon decoder, however other decoders such as Bose, Chaudhuri, Hocquerghen (BCH) Code, Hamming Code, and Trellis Code decoders may be used. Also, more than one decoder may operate on modified decisions. For example, the selector 38 may select several groupings of errors/erasures and generate modified decisions corresponding to each grouping. Each of the modified decisions may then be sent to separate decoders for decoding. The final decisions from the decoder 40 are evaluated by an estimator 42 to determine whether the sequence in the read back signal has been decoded to the correct codeword.

In most decoders, including the widely used Reed-Solomon decoder, the decoder 40 and the estimator 42 can be combined into one decoder unit. Furthermore, the functions of the selector 38, the decoder 40, and the estimator 42 can be combined to one unit, labeled as list-aided decoder 40' as in FIG. 5. Such list-aided decoder 40' takes advantage of the list of possible defects when it performs decoding. The list-aided decoder 40' eliminates the feedback loop from the estimator to the selector, and therefore reduces decoding hardware.

Figure 3:
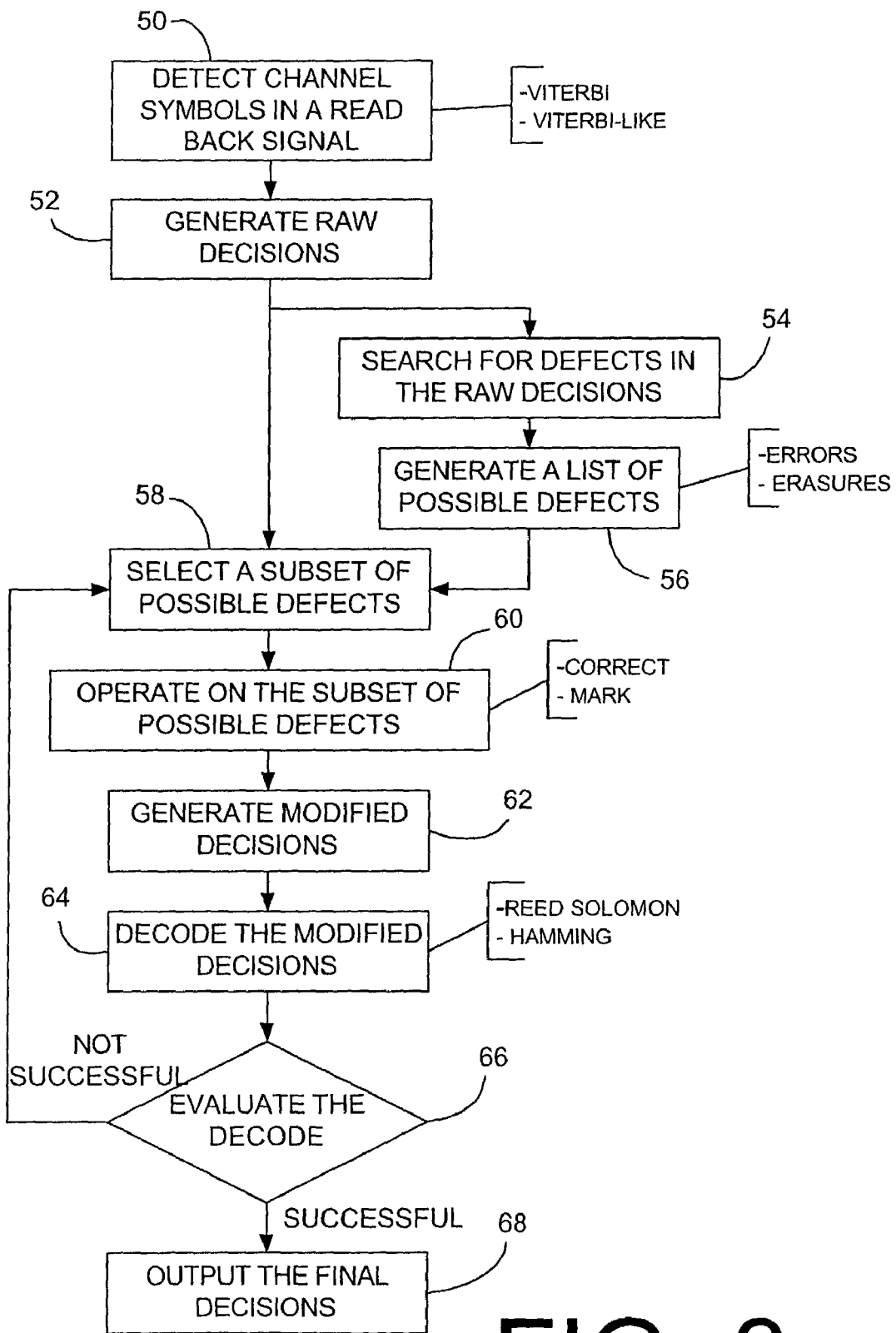
FIG. 3 is a flow diagram of one aspect of an error correction system for read back signals in accordance with FIG. 2.

FIG. 3 shows a detection scheme for a hard disk drive read back signal. At block 50, channel symbols in a read back signal are detected. Preferably, maximum likelihood decisions are made based on the read back signals to generate raw decisions, block 52. Continuing to block 54, the raw decisions are evaluated for possible defects such as possible errors and possible erasures. At block 56, a list of the possible defects is generated. The list may group the defects in any manner such as by possible errors, possible erasures, and by the likelihood of the possible defect being an actual defect. The length of the list may be fixed or variable including limiting the length to a predetermined quantity of possible defects and including all possible defects that exceed a likelihood threshold. Continuing to block 58, a subset of the possible defects associated with the raw decisions is selected. The subset of possible defects may include possible errors, possible erasures, or a combination of possible errors and erasures. At block 60, the subset of possible defects and corresponding raw decisions are operated on to attempt to correct the possible errors and/or mark the possible erasures. Continuing to block 62, modified decisions are generated as a function of operating on the subset of possible defects and corresponding raw decisions. At block 64, the modified decisions are decoded to generate final decisions. At decision block 66, the final decisions are evaluated to determine whether the sequence was decoded to a correct codeword. If the decode is successful and the correct codeword is decoded, the final decisions are output. But, if a wrong codeword is decoded, control is transferred to block 58, and another subset of possible defects is selected. The detection scheme may continue to loop through blocks 58 to 66 until a correct codeword is decoded, the loop is executed a predetermined number of times, or until a specified threshold is reached such as computation time. Computation speed is enhanced by not looping back to the detector to eliminate errors by redetecting the sequence within the read back signal. Instead, the detection scheme operates on the originally detected sequence and uses the selector and decoder to correct or mark subsets of the defects to obtain a correct codeword.

It is noted that the embodiments of FIGS. 5 and 7 employ the list-aided decoder which decodes with the knowledge of the possible defects. Such implementations eliminate the feed back loop from block 66 to block 58 in FIG. 3, and therefore reduce hardware complexity.

As an example of one implementation, the 12 most-likely defects in the raw decisions may be listed and the selector may correct/mark up to 3 defects at a time from the list of 12 defects. In this case, the decoder may need to perform up to 299 decoding attempts, with an average number of decoding attempts of about 150.

Figure 4:
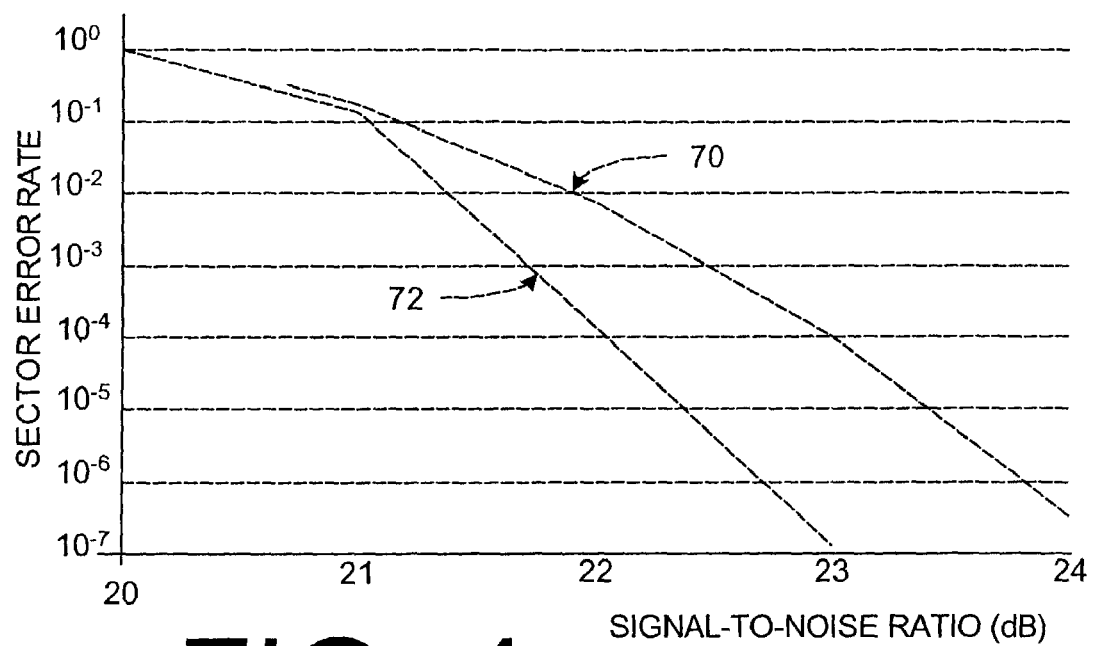
FIG. 4 is a data graph illustrating the performance improvement of one aspect of an error correction system for read back signals.

FIG. 4 shows a comparison simulation of the sector error rate for a conventional detector 70 versus a detector 72 in accordance with the principles of the invention. For the simulation, it is assumed the decoder employs a Reed-Solomon Code with 10-bit symbols and can correct 3 symbol errors. The simulation is performed with a user bit density (UBD) of 2.747 and 100% additive white Gaussian noise.

A number of embodiments of the invention have been described. The invention may be implemented in any known means including hardware, software, firmware, middleware and combinations thereof. It will be understood that various modifications may be made without departing from the spirit and scope of the invention. Accordingly, other embodiments are within the scope of the following claims.

What is claimed is:

1. A signal detector to detect symbols in a read back signal, comprising:
    a first detector to generate a best decision as a function of the read back signal and to generate a list of alternate candidate decisions that include at least one next best decision for each symbol of the read back signal, wherein the read back signal was encoded using at least one of Reed-Solomon encoding, Bose Chaudhuri Hocquerghen (BCH) encoding, Hamming encoding, and Trellis encoding; and
    a list-aided decoder to generate a final decision for each of the symbols based on both the best decision and the at least one next best decision from the first detector, wherein said list-aided decoder performs at least one of Reed-Solomon decoding, BCH decoding, Hamming decoding, and Trellis decoding.

2. A signal detector according to claim 1, wherein the first detector further comprises an alternate candidate circuit comprising:
    a post processor to generate the at least one next best decision; and
    a list circuit to select the alternate candidates from the at least one next best decision.

3. The signal detector of claim 2 wherein the alternate candidate circuit searches for a predetermined quantity of possible defects in the best decision.

4. The signal detector of claim 3 wherein possible defects include possible errors and possible erasures.

5. The signal detector of claim 1 wherein the first detector is a Viterbi detector.

6. The signal detector of claim 1 wherein the list-aided decoder comprises a signal decoder which is selected from the group consisting of Reed Solomon decoders and Hamming decoders.

7. The signal detector of claim 1 wherein the list-aided decoder selects a predetermined quantity of the possible errors for correction.

8. The signal detector of claim 1 wherein the list-aided decoder marks a predetermined quantity of possible errors as possible erasures.

9. The signal detector of claim 1 being coupled to a signal preconditioner and an interface circuit to form a read channel device.

10. The signal detector of claim 1 wherein said list-aided decoder evaluates said best decision and said at least one next best decision until said read back signal are decoded to a correct codeword.

11. The signal detector of claim 1 wherein said list-aided decoder generates said final decision based on the best decision and the at least one next best decision from the first detector and not directly based on said read back signal.

12. A signal detector to detect symbols in a read back signal, comprising:
    first means for generating a best decision as a function of the read back signal and a list of alternate candidate decisions that include at least one next best decision for each symbol of the read back signal, wherein the read back signal was encoded using at least one of Reed-Solomon encoding, Bose Chaudhuri Hocquerghen (BCH) encoding, Hamming encoding, and Trellis encoding; and
    second means for generating a final decision for each of the symbols based on both the best decision and the at least one next best decision from the first means, wherein said second means performs at least one of Reed-Solomon decoding, BCH decoding, Hamming decoding, and Trellis decoding.

13. The signal detector according to claim 12, wherein the first means comprises:
    post processing means for generating the at least one next best decision; and list means for selecting the alternate candidates from the at least one next best decision.

14. The signal detector of claim 12 wherein the first means is a Viterbi detector.

15. The signal detector of claim 12 wherein the second means comprises decoding means which is selected from the group consisting of Reed Solomon decoders and Hamming decoders.

16. The signal detector of claim 12 wherein the first means searches for a predetermined quantity of possible defects in the best decision.

17. The signal detector of claim 16 wherein possible defects include possible errors and possible erasures.

18. The signal detector of claim 12 wherein the second means selects a predetermined quantity of the possible errors for correction.

19. The signal detector of claim 12 wherein the second means marks a predetermined quantity of possible errors as possible erasures.

20. The signal detector of claim 12 being coupled to a means for preconditioning the read back signal and a means for interfacing to form a read channel device.

21. The signal detector of claim 12 wherein said second means evaluates said best decision and said at least one next best decision until said read back signal are decoded to a correct codeword.

22. The signal detector of claim 12 wherein said second means generates said final decision based on the best decision and the at least one next best decision from the first means and not directly based on said read back signal.

23. A detecting method for read back signal, comprising:
    (a) detecting symbols in the read back signal, wherein the read back signal was encoded using at least one of Reed-Solomon encoding, Bose Chaudhuri Hocquerghen (BCH) encoding, Hamming encoding, and Trellis encoding;
    (b) generating at least one best decision and a list of alternate candidate decisions that includes at least one next best decision for each symbol of the read back signal, and selecting one of the alternate candidates; and
    (c) generating final decisions in accordance with the outputs of step (a) and step (b), wherein said generating final decisions includes performing at least one of Reed-Solomon decoding, BCH decoding, Hamming decoding, and Trellis decoding.

24. The method of claim 23 wherein possible defects include possible errors and possible erasures.

25. The method of claim 24 wherein step (b) includes selecting a predetermined quantity of the possible errors for correction.

26. The method of claim 24 wherein step (b) includes marking a predetermined quantity of possible errors as possible erasures.

27. The method of claim 23 wherein step (b) includes searching for a predetermined quantity of possible errors in the at least one best decision.

28. The method of claim 27 further including listing the possible errors; and
    wherein step (b) includes selecting the portion of the possible errors from a list.

29. The method of claim 23 wherein step (a) includes applying a Viterbi detector.

30. The method of claim 23 wherein step (c) includes applying a Reed Solomon decoder.

31. The method of claim 23 further comprising evaluating said best decision and said at least one next best decision until said read back signal are decoded to a correct codeword.

32. The method of claim 23 further comprising generating said final decision based on the best decision and the at least one next best decision from the first detector and not directly based on said read back signals.

33. A computer program embodied in a computer-readable medium to configure a general purpose computer to perform a detecting method for communication signals comprising:
    (a) detecting symbols in the read back signal, wherein the read back signal was encoded using at least one of Reed-Solomon encoding, Bose Chaudhuri Hocquerghen (BCH) encoding, Hamming encoding, and Trellis encoding;
    (b) generating at least one best decision and a list of alternate candidate decisions that includes at least one next best decision for each symbol of the read back signal, and selecting one of the alternate candidates; and
    (c) generating final decisions in accordance with the outputs of step (a) and step (b), wherein said generating final decisions includes performing at least one of Reed-Solomon decoding, BCH decoding, Hamming decoding, and Trellis decoding.

34. The computer program of claim 33 wherein step (b) includes searching for a predetermined quantity of possible defects in the at least one best decision.

35. The computer program of claim 34 wherein possible defects include possible errors and possible erasures.

36. The computer program of claim 35 further including listing the possible errors; and
wherein step (b) includes selecting the portion of the possible errors from a list.

37. The computer program of claim 35 wherein step (b) includes selecting a predetermined quantity of the possible errors for correction.

38. The computer program of claim 35 wherein step (b) includes marking a predetermined quantity of possible errors as possible erasures.

39. The computer program of claim 33 wherein step (a) includes applying a Viterbi detector.

40. The computer program detector of claim 33 wherein step (c) includes applying a Reed Solomon decoder.

41. The computer program of claim 33 further comprising evaluating said best decision and said at least one next best decision until said read back signal are decoded to a correct codeword.

42. The computer program of claim 33 further comprising generating said final decision based on the best decision and the at least one next best decision from the first detector and not directly based on said read back signal.

43. A disk drive comprising:
a media to store information;
a receiver to read the information and generate a read back signal, wherein the read back signal was encoded using at least one of Reed-Solomon encoding, Bose Chaudhuri Hocquerghen (BCH) encoding, Hamming encoding, and Trellis encoding;
a first detector to generate a best decision as a function of the read back signal and to generate a list of alternate candidate decisions that include at least one next best decision for each symbol of the read back signal; and
a list-aided decoder to generate a final decision for each of the symbols based on both the best decision and the at least one next best decision from the first detector, wherein said list-aided decoder performs at least one of Reed-Solomon decoding, BCH decoding, Hamming decoding, and Trellis decoding.

44. The disk drive of claim 43 wherein the first detector comprises an alternate candidate circuit comprising:
a post processor to generate the at least one next best decision; and
a list circuit to select the alternate candidates from the at least one next best decision.

45. The disk drive of claim 44 wherein the alternate candidate circuit searches for a predetermined quantity of possible defects in the best decision.

46. The disk drive of claim 45 wherein possible defects include possible errors and possible erasures.

47. The disk drive of claim 46 wherein the list-aided decoder marks a predetermined quantity of possible errors as possible erasures.

48. The disk drive of claim 46 wherein the list-aided decoder selects a predetermined quantity of the possible errors for correction.

49. The disk drive of claim 43 wherein the first detector is a Viterbi detector.

50. The disk drive of claim 43 wherein the list-aided decoder comprises a signal decoder which is selected from the group consisting of Reed Solomon decoders and Hamming decoders.

51. The disk drive of claim 43 being coupled to a signal preconditioner and an interface circuit to form a read channel device.

52. The disk drive of claim 43 wherein said list-aided decoder evaluates said best decision and said at least one next best decision until said read back signal are decoded to a correct codeword.

53. The disk drive of claim 43 wherein said list-aided decoder generates said final decision based on the best decision and the at least one next best decision from the first detector and not directly based on said read back signal.

54. A disk drive, comprising:
means for storing information;
means for reading the information and for generating a read back signal, wherein the read back signal was encoded using at least one of Reed-Solomon encoding, Bose Chaudhuri Hocquerghen (BCH) encoding, Hamming encoding, and Trellis encoding;
first means for generating a best decision as a function of the read back signal and a list of alternate candidate decisions including at least one next best decision for each symbol of the read back signal;
second means for generating a final decision for each of the symbols based on both the best decision and the at least one next best decision from the first means, wherein said second means performs at least one of Reed-Solomon decoding, BCH decoding, Hamming decoding, and Trellis decoding.

55. The disk drive of claim 54 wherein the first means searches for a predetermined quantity of possible defects in the best decision.

56. The disk drive of claim 55 wherein the possible defects include possible errors and possible erasures.

57. The disk drive of claim 56 wherein the first means comprises:
a post processing means for generating at least on next best decision; and
a list means for selecting the alternate candidates from the at least one next best decision.

58. The disk drive of claim 56 wherein the second means selects a predetermined quantity of the possible errors for correction.

59. The disk drive of claim 56 wherein the second means marks a predetermined quantity of possible errors as possible erasures.

60. The disk drive of claim 54 wherein the first means is a Viterbi detector.

61. The disk drive of claim 54 wherein the first means comprises decoding means which is selected from the group consisting of Reed Solomon decoders and Hamming decoders.

62. The disk drive of claim 54 being coupled to a means for preconditioning the read back signal and a means for interfacing to form a read channel device.

63. The disk drive of claim 54 wherein said second means evaluates said best decision and said at least one next best decision until said read back signal are decoded to a correct codeword.

64. The disk drive of claim 54 wherein said second means generates said final decision based on both the best decision and the at least one next best decision from the first means and not directly based on said read back signal.

* * * * *